United States Patent Office 2,970,989
Patented Feb. 7, 1961

2,970,989

POLYMERIZATION OF ETHYLENE

Howard M. Hoxie, Avon Lake, Ohio, assignor to Goodrich-Gulf Chemical, Inc., Pittsburgh, Pa., a corporation of Delaware No Drawing. Filed Mar. 30, 1956, Ser. No. 575,002

4 Claims. (Cl. 260—94.9)

The present invention relates generally to the polymerization of ethylene and more specifically to the polymerization of ethylene in an inert organic solvent containing an organometallic catalyst.

Recent catalyst developments include organometallic catalysts for the solution polymerization of ethylene under low pressures. The polyethylene produced by this process is of such extremely high molecular weight that the polymer is insoluble in most hydrocarbon solvents. As a result, the reaction mixture is a slurry of granular polymer in the solvent. Sometimes, in normal operation with this system in the larger sizes of polymerization reactors, a tightly adherent film of polyethylene seems to be deposited on the agitator and on the heat transfer walls of the reactor. As successive runs are made, the film thickness soon accumulates to a point where the heat transfer capacity of the reactor is impaired and agitation may be interfered with. When this occurs, the reactor must be shut down and scraped out. This not only takes the equipment out of use but the opening of the reactor introduces poisons which are difficult to remove, and as a result, a high proportion of first runs (after cleaning) will be defective.

In accordance with the present invention, however, it has been found that deposition of polymer during the solution polymerization of ethylene may be effectively inhibited by the addition to the solution of a solvent-soluble filming amine such as the product of the condensation of a rosin amine (dehydroabietylamine) with an alkylene oxide such as ethylene oxide. Not only is much less polymer deposited but the small deposits, if any, are spotty and much less adherent so as to be much more easily removed.

These additives, surprisingly, have no discernible effects on the activity of organometallic catalysts or on the color and quality of the polyethylene product. The condensates are effective in any hydrocarbon solvent in which they are soluble. Polyethylene isolated from solutions containing the rosin amine/alkylene oxide condensates is usually much more easily dispersed in water as will appear below.

The concentration of the filming amine required is very small. For example, with the rosin amine/alkylene oxide condensates, concentrations of only 1 or 2 parts per million have a significant antideposition effect and concentrations of as much as 100 p.p.m. or more can be employed, if desired. Generally, however, only about 5 to about 15 p.p.m., based on the total solvent, will be found sufficient.

The antideposition agents of this invention are amines of high molecular weight and are of the types produced by reduction of high molecular weight fatty acid amines (10 to 20 or more carbon atoms) or condensing an alkylene oxide such as ethylene oxide, propylene oxide, mixtures of these and other alkylene oxides and the like, preferably ethylene oxide, with a rosin amine (dehydroabietylamine). The proportion of ethylene oxide, for example, which need be reacted with the rosin amine to produce a product having antideposition properties is not known with exactitude, although as little as 1 mole of ethylene oxide per mole of rosin amine produces a fully satisfactory material. Condensates of this type which are low in ethylene oxide content are more readily soluble in hydrocarbon solvents, with the solubility in aliphatic solvents beginning to fall off in the region of about 11 moles of ethylene oxide per mole of rosin amine and in aromatic solvents somewhere between 11 and 20 moles/mole of rosin amine. Above 11 moles the solubility of the condensates in water, in esters, alcohols, and ketones is markedly increased.

In some cases the condensate may contain a "coupling agent" such as isopropanol, butanol, and the like to increase the compatibility of the higher ethylene oxide materials in hydrocarbon solvents. For this purpose, up to about 30 or more percent by weight (based on the condensate) of a suitable coupling agent may be employed.

The antideposition agents of this invention are effective when ethylene is polymerized in aliphatic, aromatic or cycloaliphatic solvents, providing the condensate is soluble in the solvent used. Solvents which may be employed include aliphatics such as butane, pentane, hexane, heptane, "Deobase" kerosene, Fischer-Tropsch hydrocarbons and other aliphatics, benzene, toluene, xylene and other aromatics, and cyclohexane and other cycloaliphatic solvents.

In the method of this invention the catalysts employed are organometallic catalysts made up of metal atoms connected to radicals capable of joining to metal atoms in organometallic compounds, at least one of the latter radicals being an organic radical connected to a metal atom through a carbon atom, and at least one of the metal atoms being a heavy metal occurring in the 4 to 10 positions of the long periods of the periodic table as arranged in short and long periods in the table shown on page 342, Handbook of Chemistry and Physics, 33rd edition, published by Chemical Rubber Publishing Co., Cleveland, Ohio, 1952.

In this definition of catalyst the term "radicals capable of linking to metal in organometallic compounds" includes (1) organic radicals linked to metal through a carbon atom such as alkyl radicals, aryl radicals, cycloalkyl radicals and other hydrocarbon radicals, all of which are sometimes hereafter designated as "R," (2) oxy hydrocarbon radicals such as alkoxy radicals, aryloxy radicals, etc., (3) organic salt-forming radicals such as the acetate radical, the oxalate radical, the acetylacetone radical, etc., (4) inorganic salt-forming radicals such as halogen atoms (F, Cl, Br, and I) as well as oxyhalide radicals, etc., and (5) hydrogen atoms, all such radicals sometimes being designated as "X." The term "heavy metal occurring in the 4th to 10th position of the long periods of the periodic table etc." includes the metals of groups IVB, VB, VIB, VIIB and VIII including titanium, zirconium, hafnium, vanadium, niobium (columbium), tantalum, chromium, molybdenum, tungsten, manganese, technetium, rhenium, iron, cobalt, nickel, ruthenium, rhodium, palladium, osmium, iridium and platinum as well as metals in corresponding positions in the last long period in the so-called "actinium series" such as thorium and uranium.

Such catalysts include single compounds of the structure

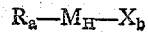

wherein $M_H$ is one of the heavy metals mentioned above and $a$ and $b$ equal the valence H of $M_H$, and $b$, but not $a$, can be zero, and R and X are above, and also catalysts made by interreacting 2, 3 or more separate compounds including (1) and alkyl donor substance such as any alkyl metal compound, particularly aluminum and tin alkyl compounds, (2) a heavy metal compound, and, optionally, (3) a metallo-halide compound. The former type includes alkyl titanium compounds and the latter type includes such combinations as $R_3Al/TiCl_4$; $R_2AlCl/TiCl_4$; $R_4Sn/TiCl_4$; $R_4Sn/TiCl_4/AlCl_3$ and many others. Particularly desired are the catalysts made by reacting (1) an alkyl aluminum compound of the structure $R_a$-Al-$X_b$ where R, X, $a$ and $b$ have the significance given above and (2) a tetravalent titanium compound, preferably a titanium tetrahalide such as $TiCl_4$. Illustrative catalysts of the preferred type include the reaction products of triisobutyl aluminum and $TiCl_4$; of diisobutyl aluminum chloride and $TiCl_4$; and the like.

The preferred type of polymerization reaction wherein the antideposition agents of this invention may be employed to best advantage are carried out in an inert solvent, such as any of those mentioned above, and in the absence of substantial amounts of oxygen or air, moisture, alcohols, esters, ketones and other active oxygen containing substances; amines; divalent sulfur-containing compounds; and the like. These and other substances have the ability to react with the extremely active organometallic catalyst. The polymerization is most conveniently carried out in an inert atmosphere such as nitrogen, argon, helium or hydrocarbon vapors. The solvent, the catalyst or catalyst-forming ingredients, and the antideposition agent are combined and ethylene gas introduced. Usually ethylene is rapidly absorbed, even at low pressures. Temperatures below about 80° C. are preferred, usually from 5 to 75° C. being most preferred. The proportion of organometallic catalyst required is small, in the preferred $R_3Al/TiCl_4$ and $R_2AlX/TiCl_4$ type catalysts as little as 1 or 2 (gram) millimoles per liter of solven of each ingredient usually being sufficient. Larger amounts ranging up to 10 or 20 percent by weight (based on monomer) can be employed, if desired.

The invention will now be more fully described with reference to several specific examples, which examples are intended to be illustrative only.

Example I

In this example ethylene is polymerized in benzene employing a catalyst made by reacting diisobutyl aluminum chloride, $TiCl_4$ and $AlCl_3$. To 225 gallons of dried, deaerated benzene there are added sufficient $TiCl_4$ to make 2.20 millimoles per liter (mM./liter) on the solvent, sufficient diisobutyl aluminum chloride to make 2.27 mM./liter, and sufficient $AlCl_3$ to make 0.1 mM./liter. Ten parts by weight per million on the solvent of a rosin amine ethylene oxide condensate containing 11 moles of ethylene oxide per mole of rosin amine (dehydroabietylamine) and 10 percent free rosin amine are then added and the introduction of ethylene begun. Ethylene addition is carried on for 4.3 hours, the maximum pressure being about 26 pounds per square inch while the temperature ranges between 68 and 71° C. A good yield (188 to 205 pounds or more) of high molecular weight polyethylene (melt index 0.021–0.40) is obtained in the form of a slurry in benzene.

Successive runs closely similar to that described above are conducted in the same reaction vessel. After three runs no polymer build-up could be detected by visual examination through a sight glass. After eight such runs the reactor is opened up for more thorough examination. Very light build-up of polymer film can be detected on the interior surfaces although there are substantial film-free areas. The film present is easy to remove. The reactor is then closed again (without cleaning) and additional runs made. Even after a number of additional runs the film build-up is not sufficiently heavy to necessitate cleaning.

In contrast, when a similar reactor is operated with the above recipe and conditions (except for the rosin amine/ethylene oxide condensate) for 2 or 3 successive runs, so as to produce a slurry-like product of high molecular weight product similar to that described above, a film of polyethylene is deposited on the surface of the agitator and on most of the heat transfer area of the reactor itself, the thickness of the deposit being sufficient to necessitate shutting down due to poor stirring and temperature control. The deposit is extremely tenacious and difficult to remove. Thus, by using the above-described condensate as an antideposition agent it is possible to run at least 3 or 4 times as many runs before shut down and clean up is greatly facilitated because the polymer film is not continuous in nature and much less adherent.

Example II

In a similar fashion hexane or "Naphtha E" (a commercial aliphatic hydrocarbon fraction containing hexane) is employed as the solvent for the polymerization of ethylene. The catalyst system is similar to that of Example I. In one run in hexane, the rosin amine/ethylene oxide condensate described in Example I is found to be only partially effective due to its limited solubility in hexane. However, 10 p.p.m. of another condensate containing only five moles of ethylene oxide per mole of rosin amine (15 percent free rosin amine) is tried in another run and found fully effective in this type of aliphatic solvent. Repeated runs carried out with the latter condensate fail to develop continuous film-like coatings of polyethylene.

Similarly, when repeated runs are made in hexane using as a catalyst the clear reaction product of triisobutyl aluminum, $TiCl_4$ and $AlCl_3$, and employing about 10 p.p.m. on the solvent of the condensate of Example II, little film build-up is observed in as many as 10 to 12 or more runs. In every case no significant effect on polymer properties can be detected due to the presence of the condensate.

Example III

Several benzene polyethylene slurries prepared as in Example I with the 11 mole rosin amine/ethylene oxide condensate are worked up by blowing the charge (with nitrogen pressure) into a closed slurry hold-up tank filled with dry nitrogen and containing 5 to 10 percent methanol based on the volume of the charge. After agitation for awhile a small amount of water is added with agitation and then allowed to stand. An aqueous alcohol layer containing catalyst residues is withdrawn and discarded. The benezene slurry remaining is then pumped into a steam stripper column for removal of the benzene. It is noted that the polymer disperses in the aqueous stripper water with much greater facility than similar polymers made without the anti-filming agent. As a result, stripping is somewhat improved. While the rosin amine/ethylene oxide condensates are known to have mild surfactant properties, it is surprising that they have such a strong effect in such a very low concentration.

I claim:

1. The method which comprises carrying out the polymerization of ethylene in an inert hydrocarbon solvent containing (a) as a catalyst the reaction product of (1) at least one gram millimole, per liter of said solvent, of an alkyl aluminum compound selected from the class consisting of trialkyl aluminums and dialkyl aluminum chlorides, (2) at least one gram millimole, per liter of said solvent, of titanium tetrachloride, and (3) aluminum trichloride, and (b) dissolved in said solvent as an antideposition agent, from about 5 to about 15 parts by weight, per million parts by weight of said solvent, of a condensate of dehydroabietylamine with from 1 to about 11 moles of ethylene oxide per mole of said dehydroabietylamine.

2. The method as defined in claim 1 wherein the said hydrocarbon solvent is benzene and said alkyl aluminum compound is diisobutyl aluminum chloride.

3. The method as defined in claim 1 wherein the said hydrocarbon solvent is hexane and said alkyl aluminum compound is diisobutyl aluminum chloride.

4. The method as defined in claim 1 wherein the said hydrocarbon solvent is hexane and said alkyl aluminum compound is triisobutyl aluminum.

References Cited in the file of this patent

UNITED STATES PATENTS

| | | |
|---|---|---|
| 2,510,063 | Bried | June 6, 1950 |
| 2,742,455 | Sundberg | Apr. 17, 1956 |
| 2,776,953 | Taves | Jan. 8, 1957 |

FOREIGN PATENTS

| | | |
|---|---|---|
| 533,362 | Belgium | May 15, 1955 |